3,024,279
METHOD FOR PREPARING BIS-(DIMETHYL-AMINO) BORANE
Robert J. Brotherton, Fullerton, and Lowell L. Petterson, Whittier, Calif., assignors to United States Borax & Chemical Corporation, Los Angeles, Calif., a corporation of Nevada
No Drawing. Filed July 11, 1960, Ser. No. 41,762
3 Claims. (Cl. 260—551)

This invention relates as indicated to a method for preparing bis-(dimethylamino)borane.

Bis-(dimethylamino)borane, $[(CH_3)_2N]_2BH$, is a compound well known to those skilled in the art of boron chemistry. However, the prior art methods of preparing this compound have proved difficult and resulted in very poor yields.

It is therefore the principal object of this invention to provide a relatively simple method for producing bis-(dimethylamino)borane which results in excellent yields.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the many ways in which the principle of the invention may be employed.

Broadly stated, the present invention comprises the method of producing bis-(dimethylamino)borane, which consists essentially of heating tetra(dimethylamino)diboron at from about 225° C. to about 500° C. in an atmosphere substantially free of oxygen and water.

As seen from the foregoing broadly stated paragraph, the present reaction must be conducted in an atmosphere substantially free of oxygen and water. This can readily be accomplished, for example, by using an evacuated closed system or by carrying out the reaction in the presence of an inert gas such as nitrogen, argon or helium with or without the presence of an inert solvent. It is immaterial to the present process what method is used as long as the reaction is carried out in an atmosphere substantially free of oxygen and water and the reaction mass is heated to a temperature of from about 225° C. to 500° C.

So that the present invention is more clearly understood, the following example is given:

Tetra(dimethylamino)diboron (40.4 moles) was heated for about 48 hours at 300° C. in a sealed, evacuated glass tube. Fractionation of the resulting volatile products gave 31.4 moles of bis-(dimethylamino)borane.

The vapor pressures and infrared spectrum of this product were substantially identical with the data of the prior art for the same compound.

Chemical analysis of the resultant product yielded the following data:

Theory for $C_4H_{13}N_2B$: B, 10.8; N, 28.0; mol. wt. 99.98. Found: B, 10.4; N, 27.0; mol. wt. by gas density, 102.

Other modes of applying the principle of the invention may be employed, change being made as regards the details described, provided the features as stated in any of the following claims or the equivalent of such be employed.

We, therefore, particularly point out and distinctly claim as our invention:

1. The method of producing bis-(dismethylamino)-borane which consists essentially of heating tetra-(dimethylamino)diboron at from about 225° to about 500° C. in an atmosphere substantially free of oxygen and water.

2. The method of claim 1 which comprises carrying out said reaction in an evacuated closed system.

3. The method of claim 1 which comprises carrying out said reaction in the presence of an inert gas.

No references cited.